United States Patent

[11] 3,623,054

| [72] | Inventor | Rolf Wuthrich<br>Wettingen, Switzerland |
| --- | --- | --- |
| [21] | Appl. No. | 809,517 |
| [22] | Filed | Mar. 24, 1969 |
| [45] | Patented | Nov. 23, 1971 |
| [73] | Assignee | Aktiengesellschaft Brown, Boveri & Cie<br>Baden, Switzerland |
| [32] | Priority | June 5, 1968 |
| [33] | | Switzerland |
| [31] | | 8309/68 |

[54] APPARATUS FOR MONITORING HIGH-VOLTAGE RECTIFIER SYSTEMS
3 Claims, 2 Drawing Figs.

[52] U.S. Cl. .................................................. 340/248 E
[51] Int. Cl. .................................................. G08b 21/00
[50] Field of Search .................................. 340/248;
321/12; 317/14

[56] References Cited
UNITED STATES PATENTS

| 3,099,828 | 7/1963 | Kelley, Jr. .................. | 340/248 |
| 3,163,801 | 12/1964 | Vansteenkiste .............. | 340/248 X |

*Primary Examiner*—John W. Caldwell
*Assistant Examiner*—Daniel Myer
*Attorney*—Pierce, Scheffler & Parker ABSTRACT: Apparatus for monitoring high-voltage rectifier systems of the type which comprises a plurality of rectifier, e.g. thyristor stages connected in series to a source of high-voltage alternating current. Each stage is paralleled by a high-resistance circuit which includes a primary winding of a transformer wound on a magnetic core which is adjusted to substantially saturation level. A secondary winding linked with and common to all of the cores serves as a voltage-summing device for all of the primary windings and is connected across an indicating device for signifying when and how many of the rectifier stages signifying failed and thus whether or not the rectifier system is safely operational. All of the transformers may be constructed upon a common core which may, for example, have a U-shaped configuration and with the saturable transformer cores in the form of annular members surrounding the legs of the U.

PATENTED NOV 23 1971 3,623,054

INVENTOR.
Rolf Wüthrich
BY
Riem, Schiffler & Parker
Attorneys

APPARATUS FOR MONITORING HIGH-VOLTAGE RECTIFIER SYSTEMS

This invention relates to an improvement in monitoring equipment for use with series-connected rectifiers such as are used to provide high-voltage rectification assemblies. In such assemblies a large number of rectifiers, in particular semiconductor rectifiers, are connected in series to form a string. Each rectification stage of the string may be formed by one or a group of rectifiers connected in parallel.

It is known that semiconductor rectifiers diodes are readily destroyed when subjected to excess voltages or to excess current loads. When rectifying high voltages, as is the case in some high-voltage direct-current transmission installations, a large number of rectifiers which may comprise a hundred or more thyristors are connected in series. Due allowance must be made for the possible breakdown of individual rectifiers even when they are deliberately operated well below their rated performances.

It is desirable to monitor serially connected rectifiers used with high-voltage installations to ensure that remedial action can be taken before the number of individual rectifiers which become defective is so great that the remaining rectifiers are destroyed by the increased voltage to which they are subjected. The damage to the installation should such destruction occur would naturally be considerable.

SUMMARY OF THE INVENTION

Monitoring equipment for use with series-connected rectification stages comprises, in accordance with the present invention, magnetic cores adapted to operate near or at their saturation levels, high-resistance shunt circuits for connection across respective stages and each including a primary winding embracing a core, and a secondary winding linked with and common to all cores, the secondary winding serving as a voltage-summing device for all of the primary windings, and which is connected across an indicating device for signifying whether or not the rectifier system is safely operational. The stages are suitably semiconductor rectifiers such as thyristors and each stage may comprise a single rectifier or a group of parallel-connected rectifiers.

Monitoring equipment embodying the invention has the advantage that the device indicating the overall operational state of the rectifiers in the series circuit arrangement is in a circuit isolated from the rectification circuit so that the monitoring circuit is not subjected to the same high voltages. A further advantage is that in the event of one of the stages becoming defective, the monitoring equipment continues to operate and it may be so arranged that it does not provide an output signifying that remedial action must be taken, unless the number of stages which have failed corresponds to a predetermined allowable maximum.

The monitoring equipment of the invention can be arranged by suitably setting the device, to ensure that functioning of the string of rectification stages is not disrupted merely because one or few stages of the string have become inoperative. However, should a dangerous condition be reached where failure of another stage cannot be tolerated, the device operates to signify that remedial action should be taken immediately. The fact that the device operates at a lower voltage and with a completely different circuit to the rectification stages allows considerably more freedom in the arrangement of the connections to the device from the monitoring equipment.

The invention will now be described in more detail, by way of example, with reference to the accompanying drawings, in which:

FIG. 1 shows a string of serially connected rectifiers stages each of which is shown as containing two paralleled rectifiers referenced 1 and 1'. Obviously, each stage may comprise a single thyristor or more than two thyristors if desired.

Figure 1:
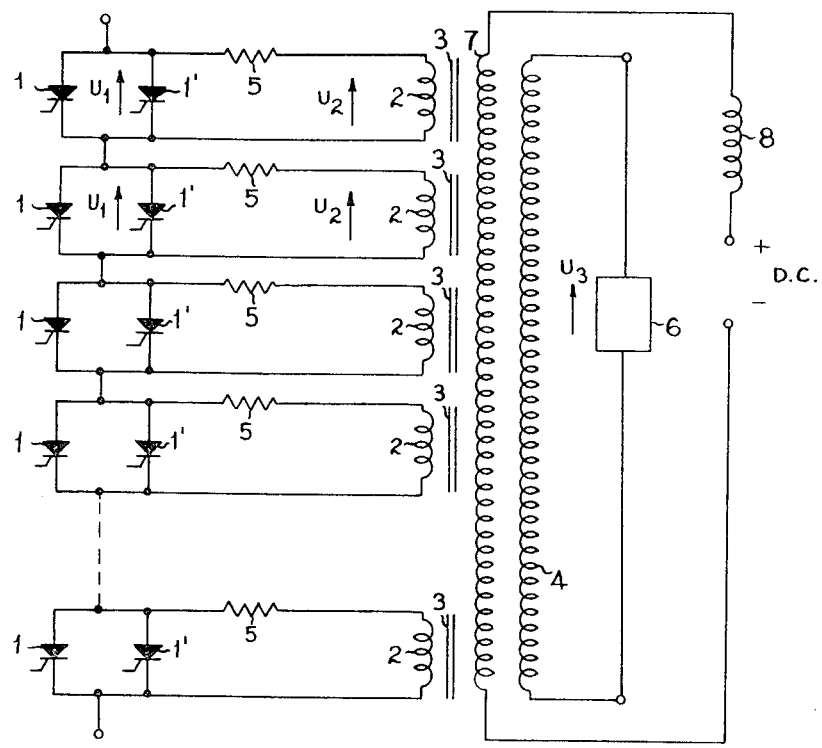
FIG. 1 illustrates a circuit of monitoring equipment diagrammatically.

As is evident from FIG. 1, each rectification stage is shunted by a like high-resistance circuit containing a primary winding 2 and a high-value ohmic resistance 5 connected in series. Each winding 2 embraces a magnet core 3 transformer coupled to a secondary winding 4 which is linked with and common to all of the cores. Opposite ends of the winding 4 are connected to a device 6 for signifying whether the operational state of the rectification stages is acceptable.

The cores 3 are also magnetically coupled to a common tertiary winding 7 connected in series with a suppression choke 8 across a source of direct current. The direct current flowing in the tertiary winding is adjusted to a level which premagnetizes all of the cores to a level close to or at their saturation level.

The device indicates the total secondary voltage provided by the winding 4 and referenced $U_3$ in the drawing, and reports the falling below of one or several determining values.

When all of the thyristors of each state are operating correctly they each have a voltage impressed across them of $U_1$. A component of this voltage, shown in the drawing as $U_2$, is impressed across the primary winding 2 on magnetic core 3 of the associated shunt circuit. The voltages $U_2$ are substantially the same for all of the stages as the magnetic cores 3 are all working close to their saturation region so that voltage variations in the nonconducting direction occurring across the thyristors of the stages after they are switched between their conducting and nonconducting conditions have negligible effect on the voltage $U_2$ impressed across the primary winding 2.

The transformed voltages of the like primary windings are summed in the secondary winding 4 to provide the voltage $U_3$ applied to the monitoring device 6.

If one or more of the series-connected thyristors in the rectification stages fails, the voltage $U_1$ across it falls virtually to zero and the voltage $U_2$ likewise falls to zero so that the secondary voltage $U_3$ is reduced by one step. The device 6 is set to respond accurately to the arithmetic mean of the voltage $U_3$ so that when the number of thyristor stages which have failed exceeds the predetermined permissible limit, the device 6 operates to provide a warning signal.

Figure 2:
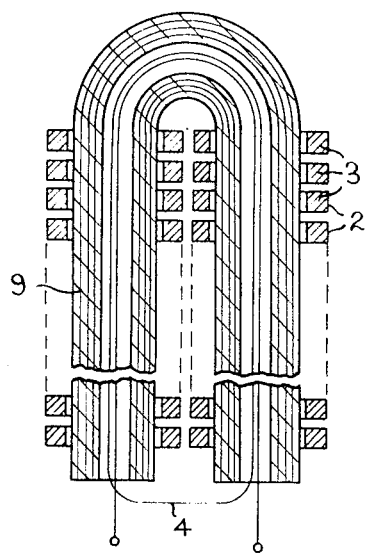
FIG. 2 shows one arrangement of the magnetic cores and primary and secondary windings.

FIG. 2 shows practically how the cores 3 can be arranged.

Each of the magnetic cores 3 is annular and is embraced by a toroidally wound primary winding 2. A U-shaped hollow insulation sleeve 9 is threaded through the cores and spaces the primary windings from the secondary (4) and tertiary (7) windings which pass through the interior of the sleeve. In FIG. 2 only the secondary winding 4 is shown for the sake of simplicity. Naturally insulative washers are provided between adjacent wound cores 3 to protect adjacent primary windings from one another.

Instead of having a single secondary winding 4 and a single tertiary winding 7, it is possible, of course, to locate individual secondary and tertiary windings on each of the cores and to connect the several secondary windings electrically in series so as to provide the necessary summing action of the voltages induced respectively in the windings. It is also possible to connect all of the tertiary windings in series so that all are energized with the same premagnetizing current from a common voltage source.

I claim:

1. A high-voltage rectifier system of the type comprising a string of rectifier stages connected in series to a source of high-voltage alternating current, and means for monitoring the operation of said rectifier system, said monitoring means comprising a high-resistance circuit individual to and connected in shunt with each of said rectifier stages, each said high-resistance circuit being alike and including a high ohmic resistance connected in series with a primary winding embracing magnetic core, a secondary winding linked with and common to all of said magnetic cores and which serves to effect a summation of the voltages respectively induced therein by said primary windings, a tertiary winding linked with and common to all of said cores, a source of direct current connected to said tertiary winding for premagnetizing said cores to saturation level, and a device connected to said secondary winding and which provides an indication of the total voltage induced in said secondary winding.

2. A high-voltage rectifier system as defined in claim 1 wherein said magnetic cores have an annular configuration and which further includes a hollow U-shaped sleeve of insulating material, said annular cores being mounted upon and surrounding the legs of said insulating sleeve, and said secondary and tertiary windings passing through the interior of said sleeve.

3. A high-voltage rectifier system as defined in claim 1 and which further includes a choke connected in series with said tertiary winding.